United States Patent [19]
Oswald

[11] Patent Number: 5,641,238
[45] Date of Patent: Jun. 24, 1997

[54] QUICK CHANGE COUPLING

[76] Inventor: Fred Oswald, 65 Channel Dr., Port Washington, N.Y. 11050

[21] Appl. No.: 592,060

[22] Filed: Jan. 26, 1996

[51] Int. Cl.$^6$ .................................................. B01F 11/00
[52] U.S. Cl. ........................ 403/359; 403/343; 403/321; 366/344; 464/901
[58] Field of Search .................... 366/123, 344; 464/901; 403/359, 291, 321, 343, 322

[56] References Cited

U.S. PATENT DOCUMENTS

| | | | |
|---|---|---|---|
| 867,162 | 9/1907 | Seidl . | |
| 1,760,843 | 5/1930 | Hasty | 403/322 X |
| 2,430,817 | 11/1947 | Jackson | 366/123 X |
| 2,645,944 | 7/1953 | Crichton, Jr. et al. | 403/343 X |
| 2,715,822 | 8/1955 | Anderson . | |
| 2,820,655 | 11/1958 | Hileman . | |
| 2,885,232 | 5/1959 | Eberly . | |
| 3,002,365 | 10/1961 | Liliequist . | |
| 3,280,439 | 10/1966 | McCarthy | 403/322 X |
| 3,587,248 | 6/1971 | Umanos | 464/901 X |
| 3,611,748 | 10/1971 | Wallgren | 464/901 X |
| 3,743,333 | 7/1973 | Kosinski | 403/343 X |
| 4,392,836 | 7/1983 | Sugawara . | |
| 4,896,986 | 1/1990 | Terayama | 403/322 X |
| 5,108,189 | 4/1992 | Oswald . | |
| 5,149,302 | 9/1992 | Yano . | |

*Primary Examiner*—Anthony Knight
*Attorney, Agent, or Firm*—Ladas & Parry

[57] ABSTRACT

A quick change coupling is provided which is especially suitable for a flexible cable. It includes a rotary driving assembly which includes a source of rotary power, a driving adaptor section which is coupled to and rotated by this source, a driven adaptor section which is arranged in nesting relationship with the driving adaptor section and a cable which includes a shield and a core and is connected to a tool. The core is engaged with the driven adaptor section and is rotated by the same. Also provided is a shield adaptor section which engages the shield of the cable and is displaceable by the same to engage the driven adaptor section to urge the latter to penetrate into the driving adaptor section. A locking section is included which is effective upon penetration of the driven adaptor section into the driving adaptor section by a predetermined amount to fix a nesting relationship with the same. A control section is also provided to disengage the shield adaptor section in part from the driven adaptor section after the nesting relationship has been established. This is accomplished in such a manner that rotary forces are transmitted between the driving and driven adaptor sections but such that no friction is developed between the shield adaptor section and the driven adaptor section.

20 Claims, 3 Drawing Sheets

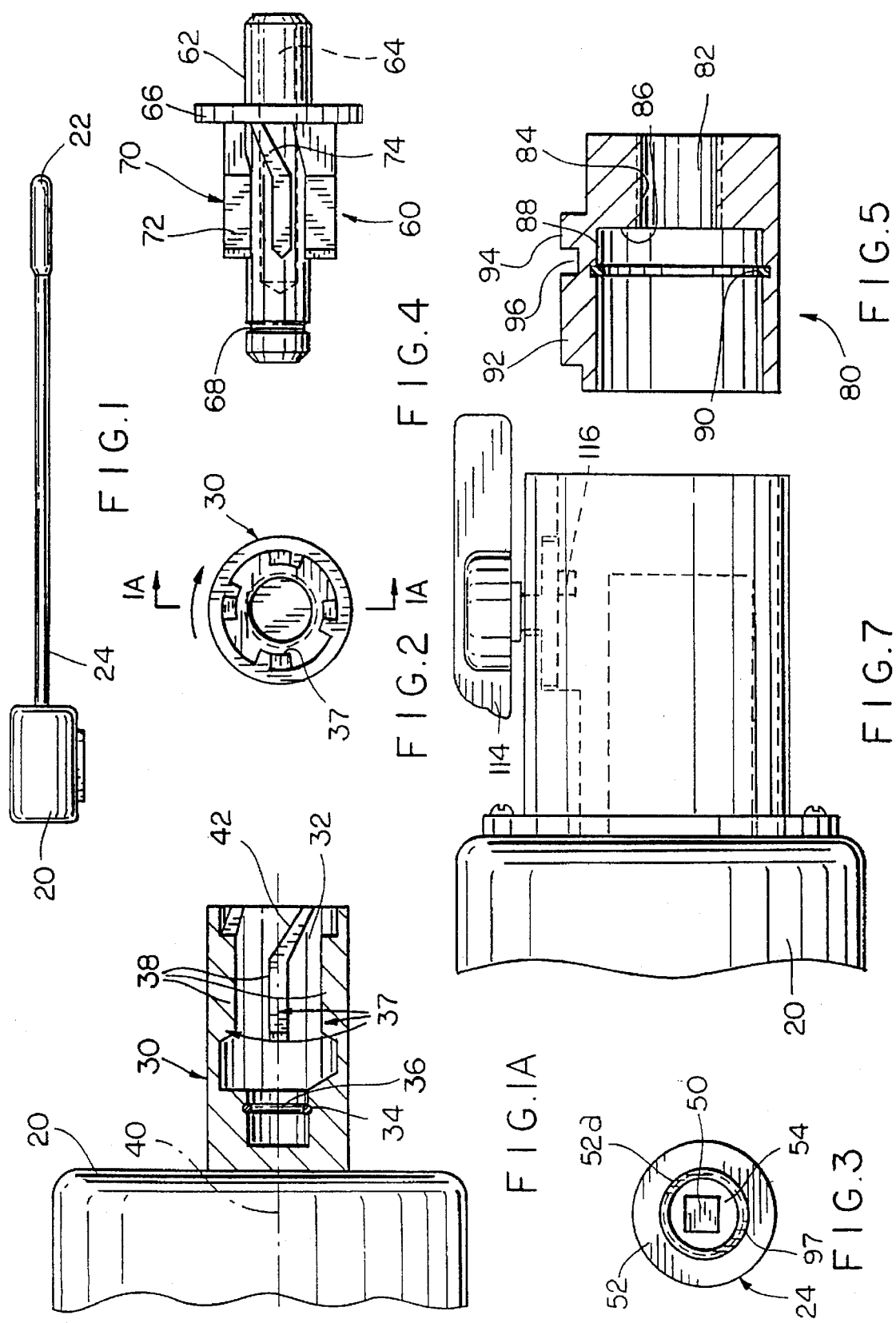

QUICK CHANGE COUPLING

FIELD OF INVENTION

This invention relates to quick change couplings and more particularly to rotary driving assemblies especially suitable for driving flexible cables and the like.

BACKGROUND

It is known that flexible shafts or cables can be provided for driving tools from a source of rotary power or the like. Among the tools which can be thusly driven are vibrator heads such as disclosed in U.S. Pat. No. 5,108,189. Such cables consist of inner cores surrounded by flexible shaft shields or housings. The ends of such cores are adapted for engagement by a prime mover such as a rotary electric motor at one end thereof while the other end is adapted for engagement with a tool which can be driven by a rotary force.

In one known type of arrangement, the inner core is provided with square ends which slide into square holes one of which is provided at the end of a rotary motor shaft while the other end is also squared to be accommodated in a square hole associated with the tool which is to be driven. The ends of the core shield or housing are threaded and can be threadably engaged with threaded openings respectively provided in the rotary motor shaft and in the tool.

By way of attempts to simplify the removal of a flexible cable from the associated motor, various quick change couplings have been employed. To accommodate the core of a flexible cable, it is also known to employ ball bearings to fix the position of the driven cable and particularly the core thereof. Such an arrangement is expensive to make and the ball bearings develop heat and wear out comparatively rapidly thereby requiring replacement.

In another arrangement, the core of a flexible cable slips directly into a square hole in a rotary shaft associated with an electric motor. In this arrangement as well as in other arrangements, the core is covered with grease which readily exudes out of the flexible core housing upon detachment of the cable from the tool and/or driving motor.

In still another arrangement, an adaptor is provided for the core of a flexible cable, the core being provided with a collar by means of which the adaptor forces the core into engagement with a square driving hole. The adaptor is engaged by a spring-loaded plunger by means of which the core is retained in the square driving hole associated with the associated rotary electric motor. The problem here is that the collar rotates at a high speed and rubs against a shoulder in the adaptor by means of which the core is forced into a hole engaging position. This arrangement undersirably develops heat and furthermore is subject to frictional wear due to which the coupling eventually becomes unusable.

In researching my invention in order to evaluate further the novelty thereof, the following U.S. patents were found: U.S. Pat. Nos. 867,162; 2,715,822; 2,820,655; 2,885,232; 3,002,365; 4,392,836 and 5,149,302.

In U.S. Pat. No. 5,149,302, H. Yano discloses a device for connecting a screw shaft and a drive cable of a shoulder-belt position adjusting device useful in connection with a seat belt. In the disclosed device, a projection extends through a stopper and is adapted for insertion into a hole of a rotatable member. When two joints are moved together, a projection is brought into engagement with the end surface of a receiving element. As a consequence, one of the joints is prevented from being disengaged from the second of the joints. This provides a connection between the screw shaft and the drive cable. A projection is inserted into a bore so as to transmit rotation of the coupling member to the rotatable member. This arrangement is such as to maintain surfaces together which generates heat and provides for relatively rapid wear. The arrangement also lacks the positive engagement of elements to provide a force which holds the coupled elements together.

N. Sugawara discloses in U.S. Pat. No. 4,392,836 a device for connecting a speedometer to a flexible shaft. In this arrangement the tips of two claws engage an annular groove thereby connecting a driving device to the speedometer. With a front tube part fitted onto a stem, an end part of the inner shaft associated therewith is fit into a hole of square cross-section provided in a rotating shaft. Under this condition, the shafts rotate together with the inner shaft. In disconnecting the speedometer from the flexible shaft, the disconnecting work is described as being easily performed by the pushing of an arm member against a connecting tube described in the patent. This structure lacks many features of the present invention as will be seen hereinbelow.

In U.S. Pat. No. 3,002,365, J. Liljequist reveals a coupling device which provides, so it is alleged, for a quick change marine propeller. The forward end of a mounting sleeve is radially grooved to engage a shear pin for transmitting motion from the propeller shaft to the propeller through a mounting sleeve 15. Employed in this transmission is an elastomeric annular cushion and a hub. A key is provided which, when in its normal position of displacement subject to a bias spring, brings the associated plunger into a position substantially flush with the external surface of the hub. In this condition, the key engages a shoulder of a propeller to maintain the propeller securely in place on the shaft with its driving sleeve operatively engaged with the shear pin. This arrangement similarly fails to display the various features of the invention as will be shown hereinafter.

In U.S. Pat. No. 2,715,822, P. Anderson discloses the use of a resilient O-ring. The ring is rolled into a rotor shaft bore wherein it is deformed and placed under radial compression in order to possess a gripping capacity relative to a drive shaft and a rotary shaft. This couples the shafts together so that drive can be transmitted from one to the other. This arrangement also fails to embody various features of the present invention as will be shown hereinafter.

SUMMARY OF INVENTION

It is an object of the present invention to provide an improved coupling for transmitting a force from a source of power to an arrangement to be driven thereby.

It is a further object of the invention to provide an improved coupling for transmitting rotary power.

It is yet a further object of the invention to provide an improved coupling for the transmission of a driving force by an arrangement which permits a ready release and detachment of the driven elements from the driving elements in a force transmitting coupling.

Yet another object of the invention is to provide an improved coupling which eliminates ball bearings as well as the need for precision machining.

Still another object of the invention is to provide an improved coupling which avoids contact between stationary parts and driven or moving parts.

Another object of the invention is to provide an improved rotary coupling which prevents rotating parts from engaging with stationary parts during operation thereby avoiding friction and the generation of heat as well as the loss of power which would be otherwise due to such possible engagement.

It is still a further object of the invention to provide an improved coupling which is readily and inexpensively manufactured and which can be made for example from parts principally or entirely molded from plastics.

In achieving the above and other of its objectives, there is contemplated within the scope of the invention the provision of a coupling apparatus which includes a first section for transmitting a rotary force, a second section for engaging the first section and being rotated thereby, and a third section for engaging the second section and displacing the second section into engagement with the first section whereby the first section rotates the second section. Further provided is a control section for withdrawing the third section from the second section while leaving the latter in engagement with the first section whereby to permit rotation of the second section while avoiding the development of friction between the first and third sections which might otherwise be due to such rotation.

According to a further aspect of the invention, there is provided a locking section for yieldably holding the second section in engagement with the first section upon withdrawal of the third section from the first section.

According to another feature of the invention, a further section is provided for engaging the second section and withdrawing the same from the first section against the force exerted by the locking section.

In accordance with still a further feature of the invention, a flexible cable is engaged with and driven by the second section and projections on the first and second sections are provided for the transfer of rotary forces therebetween. These projections may preferably be in the form of engageable splines.

According to a more narrow view of the invention, a quick release rotary driving assembly is provided which includes a source of rotary power and a driving adaptor which is coupled to and rotated by this source. Further provided is a driven adaptor in nesting relationship with the driving adaptor and a cable including a shield and core with the core being engaged with the driven adaptor for being rotated by the same. A shield adaptor is furthermore provided which engages the shield of the cable and is displaceable by the same to engage the driven adaptor to urge the latter to penetrate into the driving adaptor. Further, a locking arrangement is effective upon penetration of the driven adaptor into the driving adaptor by a predetermined amount to fix the nesting relationship therebetween. Also provided is a control which disengages the shield adaptor from the driven adaptor after the nesting relationship has been established.

In a preferred embodiment of the invention, the shield adaptor section includes a shoulder and the driven adaptor section includes a collar. This shoulder engages the collar for urging the driven adaptor section to penetrate into the driving adaptor section. According to a further feature, the assembly includes a protrusion on the shield adaptor section, the protrusion and shoulder bracketting the aforementioned collar. According to still another feature, the protrusion is preferably a snap ring which encircles the driven adaptor section. More specifically, the shoulder of the arrangement is of annular form and encircles the driven adaptor section.

Another feature of the invention results from the fact that the adaptor sections include cooperating splines for the transfer of rotary power between the sections. More specifically, the splines on the respective sections include sloped parts the interengagement of which generates forces to assist in holding the driving and driven adaptor sections together.

Another feature of the invention results from the fact that the control includes first and second cooperating cam sections of which the first section is mounted on the shield adaptor section and the second cam section engages the first cam section to disengage the shield adaptor section from the driven adaptor section. In this arrangement, the first cam section includes a structure defining a curved groove and the second cam section includes a rotatable member including a male part accommodated in the aforesaid groove.

In the preferred embodiment of the invention, the core of the cable includes an end portion of polygonal cross-section and the driven adaptor section is provided with an opening receiving the end portion and having a corresponding shape.

According to another specific feature of the invention, the locking section includes an O-ring and an annular groove is provided on the driven adaptor section for receiving this O-ring in a yieldable accommodation.

According to still another feature, the shield of the cable and the shear adaptor section include matching threaded portions for locking the shield and shield adaptor sections together. Preferably, the adaptor sections moreover define a common axis of rotation and the end portion of the cable core and driven adaptor section are relatively axially displaceable. In a preferred arrangement, the cable is a flexible cable and its shield encircles the core thereof. Moreover the above mentioned protrusion is a structure of sufficient strength to be forced against the collar to overcome the locking section so that the driven adaptor section can be withdrawn from the nesting relationship with the driving adaptor section.

The above and other objects, features and advantages of the invention will be found in the detailed description which follows hereinafter as illustrated in the accompanying drawing.

DRAWING

In The Drawings:

FIG. 1 is a diagrammatic illustration of the type of structure in which the invention is employed;

FIG. 1(a) is a somewhat diagrammatical view, partially broken away and partially sectional of the driving section of an arrangement contemplated within the scope of the invention;

FIG. 2 is an end view of a portion of the structure illustrated in FIG. 1(a) wherein appears section line 1(a)–1 (a) demonstrating where the section in FIG. 1(a) is taken;

FIG. 3 is a diagrammatic end view of a flexible cable as employed in accordance with the invention;

FIG. 4 is a side view of a driven adaptor section intended for cooperation with the apparatus of FIG. 1(a) and the cable of FIGS. 1 and 3;

FIG. 5 is a sectional view of a shield adaptor intended to cooperate with the structures illustrated in FIGS. 1(a)–4;

FIG. 7 is a partial view of the structure of FIG. 6, with some modification, emphasizing the cam structure embodied therein to provide for displacement of certain elements from one another, after rotational coupling has been effected, in order to avoid friction;

DETAILED DESCRIPTION

Figure 6:
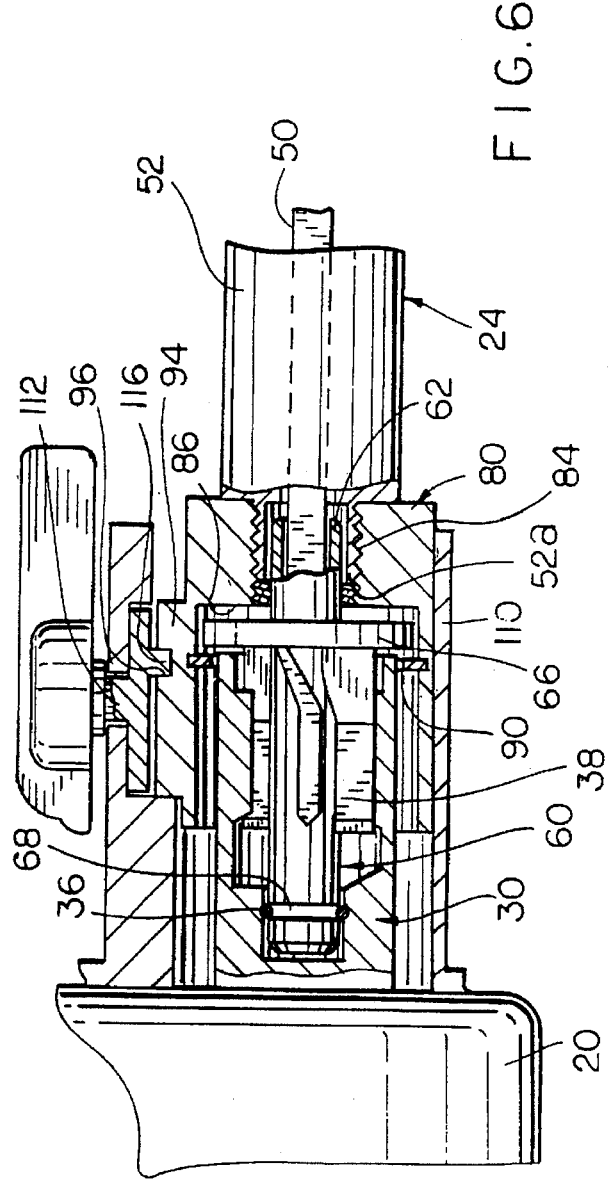
FIG. 6 illustrates the elements of FIGS. 1–5 in operative association with each other, the view being partially diagrammatic, partially sectional and partially broken away to expose the interior cooperating structure of the various elements, the view further illustrating a cam control structure.

The apparatus in FIG. 1 illustrates generally the type of apparatus into which the coupling of the invention is embodied. This apparatus includes a prime mover 20 and driven tool 22 coupled by a flexible shaft 24 to prime mover 20. The prime mover 20 may be, for example, a rotary electric motor of any type whatsoever. It will have appropriate power to drive the tool 22. The object is to couple the rotary force developed by motor 20 to the tool 22 to operate the latter. The tool 22 may be for example, a vibrator head such as employed in the treatment of wet concrete before it has set. Such a tool is illustrated in U.S. Pat. No. 5,108,189. The use of many other types of tools is possible.

The flexible shaft, as will be shown hereafter, consists of a flexible core accommodated within a flexible shield or outer covering. In accordance with the invention as will be described in greater detail hereinafter, the flexible shaft is provided with an adaptor in turn accommodated within a driven adaptor which, in turn, is accommodated in or on a driving adaptor which is rotated by the motor 20.

The motor 20 is also illustrated in part in FIG. 1(a). It includes a rotating shaft which is formed as or is connected to a driver adaptor 30 further illustrated in FIG. 2. The adaptor 30 is provided with a bore 32 within which is provided an annular groove 34 which accommodates an elastomeric or resilient O-ring 36 which provides for connection to the driven structure as will be shown hereinbelow. As will also be described further below, the driving adaptor 30 is provided with a plurality of splines 37 consisting of sections 38 which are parallel to the axis of rotation 40 and of sections 42 which are sloped relative to the axis 40 for a purpose to be explained hereinbelow.

FIG. 3 shows in cross-sectional view the structure of the flexible cable 24 referred to hereinabove with respect to FIG. 1. This flexible cable, the construction of which is well known, includes a flexible core 50 and an outer protective shield 52 which is also flexible. In a space 54 therebetween is usually provided a lubricant such as grease which enables the core 50 to rotate within the shield 52 with a minimum of friction and wear therebetween.

For the purpose of enabling the rotation of one end of the core 50 and thereby the opposite end of this core to which is attached the associated tool, there is provided a driven core adaptor 60 illustrated in FIG. 4. This structure may be a monolithic structure molded or otherwise fabricated of a plastic which may also be the material from which the driver adaptor 30 of FIG. 1 is likewise fabricated.

The driven adaptor 60 consists of a body 62 adapted for rotation on the axis of rotation 40 illustrated in FIG. 1. The body 62 is provided with a bore 64 intended to accommodate the end of the core 50 of FIG. 3. As illustrated, the core 50 is of square cross-section. It can be of other various types of polygonal cross-sections which will be accommodated by a corresponding cross-sectional shape of the bore 64. It is the intention that the core 50 be rotated within the shield 52 (FIG. 3) and for this purpose the body 62 will be rotated by engagement with the adaptor 30 (FIG. 1(a)).

Mounted on the body 62 is a collar 66 preferably circular in shape and encircling the body 62 in symmetrical relationship therewith. There is furthermore provided in the body 62 an annular groove 68 the purpose of which is to accommodate the O-ring 36 (see FIG. 1(a)) when the body 62 has penetrated to a predetermined depth within the bore 32 illustrated in FIG. 1(a). Thus, the body 62 is axially or longitudinally penetratable into the bore 32 until such time as the O-ring 36 is accommodated in groove 68 thereby to lock these elements axially together in a yieldably releaseable manner. Thus, O-ring 36 and groove 68 cooperatively constitute a locking arrangement whereby to hold the body 62 within the bore 32 so that a transfer of rotary force is permitted between splines as explained below.

To provide for the transfer of this rotary power, there are mounted on the body 62 a plurality of splines 70 including axially aligned sections 72 and sloped sections 74. The splines 70 are intended to cooperate with the splines 38 for the transfer of rotary power in a manner to be discussed in further detail hereinbelow.

To enable and provide for penetration of the driven adaptor 60 into and within the driver adaptor 30, the shield 52 of the flexible cable is provided with a shield adaptor 80 illustrated in FIG. 5. Therein, it is seen that adaptor 80 is provided with a threaded opening 82 the thread of which appears at 84 which terminates at a shoulder 86 the purpose of which will become apparent hereinafter. Internally, the shield adaptor 80 is provided with a groove 88 within which is accommodated a snap ring 90. The distance between the snap ring 90 and the shoulder 86 is intended to displaceably accommodate the collar 66 of the driven adaptor (see FIG. 4). The end of shield 52 of FIG. 3 is provided with a thread 97 which permits threadable engagement with thread 84 of FIG. 5.

The exterior of shield adaptor 80 is provided with a cam section 92 which in cooperation with a cam section 94 defines a key opening 96. The purpose of the key opening 96 and this cam arrangement is to provide for axial displacement of the shield adaptor 80 for a purpose to be explained below.

FIG. 6 illustrates the cooperative interengagement of the various parts which have been referred to hereinabove. Therein are illustrated the core 50 and the cable shield 52 within which the core 50 is accommodated. In FIG. 6 it is illustrated that the shield 52 is provided with an extension 52(a) having the thread 97 which is engageable with the thread 84 of the driven adaptor 80. Such an arrangement fixes the shield adaptor 80 on the shield 52 of the cable 24. Collar or flange 66 is entrapped and axially displaceable between the split ring 90 and the shoulder 86. Movement of the shoulder 86 by manual force or the like exerted on the cable forces shoulder 86 against the collar 66 thereby displacing the body 62 and driven adaptor 60 into the bore 32 of the driving adaptor 30. The axial displacement of the driven adaptor 60 into the bore 32 continues until the O-ring 36 is accommodated within the groove 68 whereafter the driven adaptor 60 is yieldingly held in position within the driving adaptor 30. This locking arrangement is yieldable due to the resilient nature of the O-ring 36, the locking force of which can be overcome in a way to be indicated hereinbelow.

In the condition described above, the collar 66 is in engagement with the shoulder 86. This provides for friction between these relatively rotatable parts inasmuch as shoulder 86 will be stationary and collar 66 rotating under the force generated by the motor 20. This friction is avoided in a manner to be described below by reason of which the collar 66 is axially displaced away from the shoulder 86 in accordance with a feature of the invention. Before this feature of the invention is described, however, it is to be noted that the imparting of rotational driving forces by the driving adaptor 30 to the driven adaptor 60 is provided in a positive manner by virtue of the inclusion of the aforementioned splines 38 and 70 (see FIGS. 1(a) and 4). Upon rotation of the driven adaptor by the driving adaptor, engagement between the sloped sections 42 and 74 (see FIG. 1(a) and FIG. 4) will vector the rotational force into two forces one of which is an axial force tending to hold the driven adaptor within the driving adaptor and to resist any displacement of the driven adaptor out of engagement with the driving adaptor. This will be described in greater detail hereinbelow by reference to a further embodiment of the invention sharing this mutual advantage with the embodiment illustrated in FIG. 6.

Figure 8:
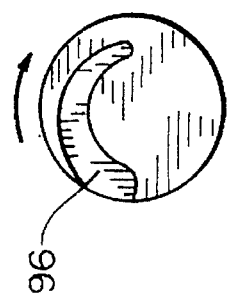
FIG. 8 is a diagrammatic view showing a cam face embodied in the structure of FIGS. 6 and 7.

Reference has been made hereinabove to axial displacement of the collar 66 and reference has also been made hereinabove to keyhole 96 provided between cam sections 92 and 94. Mounted on the motor 20 is a support 110. This support 110 supports a shaft 112 rotatable by manual force exerted through a handle 114. This force enables displacement of a cam section 116 within keyhole 96 as is also illustrated in FIGS. 7 and 8. In FIGS. 7 and 8 it is seen that keyhole 96 has the general shape of an arc which is displaced at various distances from the center of the cam. Displacement of cam section 116 in keyhole 96 causes an axial displacement of the shield adaptor 80 away from the motor. This in turn causes an axial displacement of the shoulder 86 relative to the collar 66 (see FIGS. 4 and 6) and moves collar 66 relatively away from the shoulder 86 thereby to avoid friction between these parts. In FIG. 6, it will be noted that there is no contact of the collar 66 or any part of the driven adaptor 60 with the driving adaptor 30 apart from the engagement of O-ring 36 in groove 34 and apart from engagement between the splines 36 and 70. Such movement as is caused by the cam operation is accommodated by the cable 24 inasmuch as the core 50 is axially displaceable within the shield 52 to a limited extent.

Quick decoupling of the shield adaptor and thereby the cable from within the driving adaptor 30 is provided for by the fact that the handle 114 along with cam section 116 is readily withdrawable from the keyhole 96. At the same time withdrawal by manual force of the shield adaptor 80 along with driven adaptor 60 is brought about by engagement of the split ring 90 with the collar 66 by displacement of the shield adaptor 80 to the right in FIG. 6. This overcomes the locking force of O-ring 36 in groove 60 and removes the O-ring 36 from this groove. This arrangement provides for a relatively quick release of the cable from the motor 20 and the driving adaptor 30 in such a manner to permit detachment of the associated tool from the motor and a substitution of a replacement tool or the like as desired.

Figure 9:
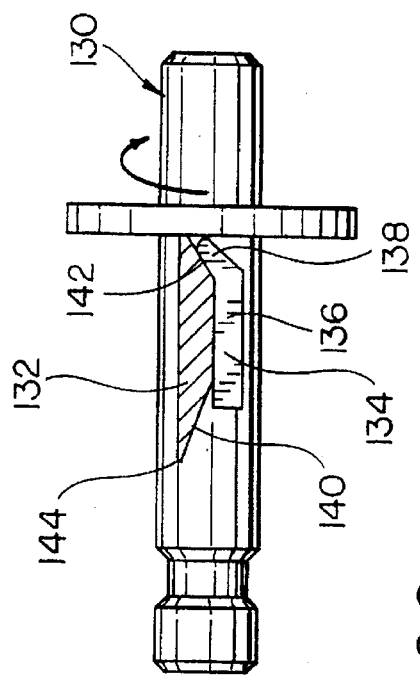
FIG. 9 illustrates a particular spline arrangement for a driven adaptor section in accordance with a further embodiment of the invention.

FIG. 9 illustrates a modification of the structure of FIGS. 1–8 to constitute a further embodiment of the invention. Therein is illustrated a driven adaptor section 130 including a representative driven spline 132 which is positively engaged and driven by a driving spline 134 in the general manner indicated above. Therein the driving spline includes an axially oriented section 136 and a sloped section 138. The driven spline is however of generally axial orientation except that it is provided with a sloped surface 140 and a further sloped surface 142. The sloped surface 140 tapers to a point 144 enabling ready penetration of the driven spline into engagement with the driving adaptor. The sloped surfaces 142 and 138 provide for the vectoring of forces, which are generated by the rotation of the driven adaptor, into one force which is axially aligned thereby tending to drive the driven adaptor to the left in FIG. 9 with a second force being developed which is transverse to the first mentioned force. The slopes 142 and 138 as illustrated in FIG. 9 are designed for rotation of the driven adaptor 30 in clockwise direction viewing the driven adaptor from the right hand in FIG. 9. Should that direction of rotation be reversed, the direction of the slopes 142 and 138 would have to be reversed.

Figure 10:
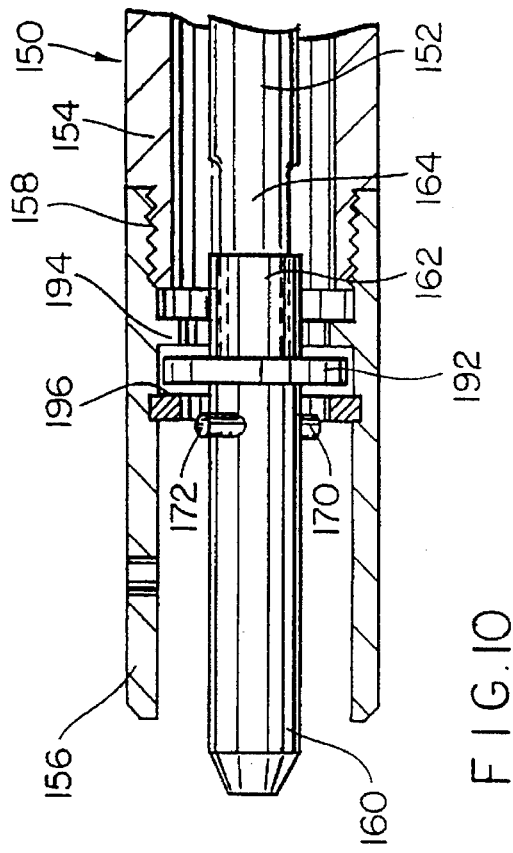
FIG. 10 illustrates diagrammatically and partially in section and broken away a cable shield adaptor and a cooperating driven adaptor in accordance with a further embodiment of the invention.
Figure 11:
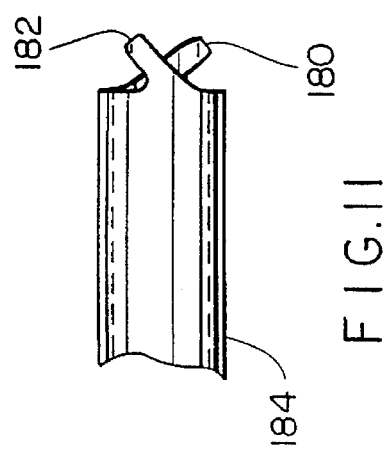
FIG. 11 illustrates a cooperating driving adaptor section for cooperation with structure illustrated in FIG. 10.
Figure 12:
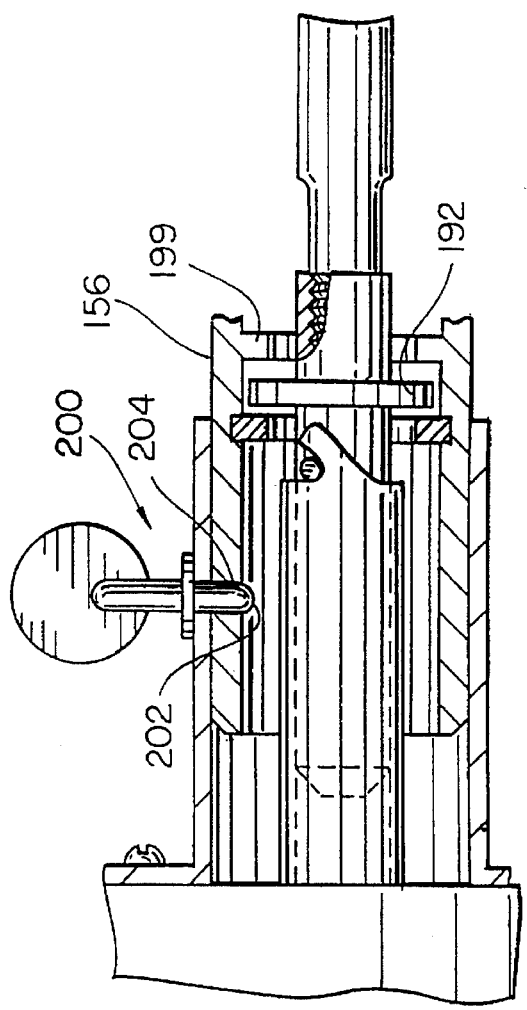
FIG. 12 illustrates a cooperating arrangement of the elements illustrated in FIGS. 10 and 11.

A further embodiment of the invention is illustrated in FIGS. 10–12. In these figures are illustrated a flexible cable 150 including a core 152 and an outer shield or cover 154 threadably engaged with a shield adaptor 156 by means of threads 158. The core 152 is accommodated within the driven adaptor 160 by the provision of a bore 162 having a shape corresponding to that of the end 164 of the core 152. In this embodiment of the invention the driven adaptor 160 is provided with radial protrusions 170 and 172. These protrusions 170 and 172 are intended for engagement by sloped protrusions 180 and 182 on driving adaptor 184 to provide for the transmission of rotational forces between the driving and driven adaptors in a manner corresponding to that previously indicated.

In this embodiment of the invention, as in the previously described embodiment, there is provided a collar 192 mounted on the driven adaptor 160 and axially displaceable by a shoulder 194. A withdrawal protrusion or ring 196 is provided for use when it is desired to withdraw the driven adaptor from engagement with the driving adaptor.

As in the prior embodiments, although not illustrated in FIGS. 10 and 11, there is provided a cam arrangement 200 (FIG. 12) which is diagrammatically illustrated as including a cam section 202 accommodated in a keyhole 204. This provides for displacement of the shield adaptor 156 whereby to move collar 192 away from engagement with the shoulder 194. This gains the advantage of avoiding friction between these parts which are relatively rotatable with respect to one another. This avoids the generation of heat and loss of power as are principal advantages of the invention.

There will now be obvious to those skilled in the art many modifications and variations of the structures set further hereinabove. These modifications and variations will not depart from the scope of the invention if defined by the following claims.

I claim:

1. A rotary driving assembly comprising a source of rotary power, a driving adaptor section coupled to and rotated by said source of rotary power, a driven adaptor section in nesting relationship with said driving adaptor section, a cable including a shield and a core, said core being engaged with said driven adaptor section for being rotated within and independently of said shield by the source of rotary power operating through said driving and driven adaptor sections, a shield adaptor section engaging said shield and being displaceable by the same to engage said driven adaptor section to urge the latter to penetrate into said driving adaptor section, locking means effective upon penetration of said driven adaptor section into said driving adaptor section by a predetermined amount to fix the nesting relationship therebetween, and control means to disengage said shield adaptor section from said driven adaptor section after the nesting relationship has been established.

2. A rotary driving assembly as claimed in claim 1 wherein said shield adaptor section includes a shoulder and said driven adaptor section includes a collar, said shoulder engaging said collar for urging said driven adaptor section to penetrate into said driving adaptor section for engagement with the same.

3. A rotary driving assembly as claimed in claim 2 comprising a protrusion on said shield adaptor section, said protrusion and shoulder bracketing said collar.

4. A rotary driving assembly as claimed in claim 3 wherein said protrusion is a snap ring encircling said driven adaptor section.

5. A rotary driving assembly as claimed in claim 4 wherein said shoulder is of annular form and encircles said driven adaptor section with which said shoulder is monolithic.

6. A rotary driving assembly as claimed in claim 1 wherein said driven and driving adaptor sections include cooperating splines for the transfer of rotary power between the sections.

7. A rotary driving assembly as claimed in claim 6 wherein the splines on said driven and driving adaptor sections include sloped parts the interengagement of which generates forces to assist in holding said driven and driving adaptor sections together.

8. A rotary driving assembly as claimed in claim 1 wherein said control means includes first and second cooperating cam means, said first cam means being mounted on said shield adaptor section, said second cam means engaging said first cam means to disengage said shield adaptor section from said driven adaptor section.

9. A rotary driving assembly as claimed in claim 8 wherein said first cam means includes a structure defining a curved groove and said second cam means includes a rotatable member including a male part accommodated in said groove.

10. A rotary driving assembly as claimed in claim 1 wherein said core includes an end portion of polygonal cross-section and wherein said driven adaptor section is provided with an opening receiving said end portion and having a cross-section corresponding thereto.

11. A rotary driving assembly as claimed in claim 1 wherein said locking means includes an O-ring and an annular groove is provided on said driven adaptor section for receiving said O-ring.

12. A rotary driving assembly as claimed in claim 1 wherein said shield and shield adaptor section include threaded portions connecting said shield and shield adaptor section together.

13. A rotary driving assembly as claimed in claim 1 wherein said adaptor sections define a common axis of rotation.

14. A rotary driving assembly as claimed in claim 10 wherein said end portion and driven adaptor section are relatively axially displaceable.

15. A rotary driving assembly as claimed in claim 1 wherein said cable is a flexible cable and said shield encircles said core.

16. A rotary driving assembly as claimed in claim 3 wherein said protrusion is a structure of sufficient strength to be forced against said collar to overcome said locking means so that said driven adaptor section can be withdrawn from the nesting relation with said driving adaptor section.

17. Apparatus comprising first means for imparting a rotary force, second means for selectively engaging said first means and being rotated thereby, third means for engaging said second means and displacing said second means into engagement with the first means whereby said first means rotates said second means, and control means for withdrawing said third means from said second means while leaving the latter in engagement with said first means whereby to permit rotation of said second means while avoiding friction between said second and third means due to said rotation.

18. Apparatus as claimed in claim 17 comprising locking means for yieldably holding said second means in engagement with said first means upon withdrawal of the third means from the second means.

19. Apparatus as claimed in claim 18 comprising further means for engaging said second means and withdrawing the same from said first means against the force of said locking means.

20. Apparatus as claimed in claim 18 further comprising a flexible cable engaged with and driven by said second means and projections on said first and second means for the transfer of rotary forces therebetween.

* * * * *